(12) United States Patent
Wigdahl et al.

(10) Patent No.: US 8,069,638 B2
(45) Date of Patent: Dec. 6, 2011

(54) BALE LUMP ELIMINATOR FOR A ROUND COTTON MODULE BALER

(75) Inventors: Jeffrey Scott Wigdahl, Ames, IA (US); Scott David Weber, Bondurant, IA (US)

(73) Assignee: Deere & Company, Moline, IL (US)

( * ) Notice: Subject to any disclaimer, the term of this patent is extended or adjusted under 35 U.S.C. 154(b) by 359 days.

(21) Appl. No.: 12/362,790

(22) Filed: Jan. 30, 2009

(65) Prior Publication Data

US 2010/0192513 A1 Aug. 5, 2010

(51) Int. Cl.
  *B65B 11/02* (2006.01)
(52) U.S. Cl. ............................... 53/587; 53/204; 53/211
(58) Field of Classification Search ............. 53/587, 53/204, 211
See application file for complete search history.

(56) References Cited

U.S. PATENT DOCUMENTS

| | | | | |
|---|---|---|---|---|
| 2,119,186 A * | 5/1938 | Streun | ........................... | 19/62 A |
| 6,272,816 B1 * | 8/2001 | Viaud et al. | ..................... | 53/587 |
| 6,622,463 B1 * | 9/2003 | Anstey et al. | ................... | 53/587 |
| 7,430,959 B2 * | 10/2008 | Routledge | ....................... | 100/87 |

\* cited by examiner

*Primary Examiner* — Hemant M Desai

(57) ABSTRACT

A baler for making large cylindrical modules of cotton includes an expansible module-forming chamber comprising a plurality of module-forming belts that are supported in side-by-side relationship across a plurality of fixed and movable belt support rolls. The module-forming chamber includes a fixed front section and a movable rear section in the form of a discharge gate mounted to an upper rear location of the front section for pivoting between a lowered baling position and a raised discharge position. Located at the bottom of the baling chamber between a bottom fixed belt support roll and a lower front roll of the lowered discharge gate is an inlet through which cotton passes into the module-forming chamber. A module wrapping arrangement is carried on the discharge gate for selectively feeding a length of plastic sheet material into the inlet for being wrapped about the circumference of a cotton module formed in the chamber. Located within the inlet in front of the lower front gate roll is a rake-like cotton bunching eliminator which operates to prevent cotton from bunching prior to being fed onto the circumference of a rotating cotton module during the operation of wrapping the module, thus eliminating the formation of lumps on the circumference of the module.

11 Claims, 6 Drawing Sheets

BALE LUMP ELIMINATOR FOR A ROUND COTTON MODULE BALER

FIELD OF THE INVENTION

The present invention relates to large round balers, and more particularly relates to such balers for forming large cylindrical cotton modules.

BACKGROUND OF THE INVENTION

Presently there are machines which harvest cotton bolls from cotton plants and then use an onboard baler to form a cylindrical cotton module. So that the cotton module holds its form and is protected from the elements until it is transported to a gin, the module is wrapped in a plastic covering before being deposited on the ground by the harvester.

It has been found that the outer surface of the wrapped cotton module tends to be irregular in shape, this irregularity in shape being in the nature of lumps of various sizes dispersed about the circumference of the module. At times, these lumps are quite excessive and cause the baler hydraulic drive system, that is used for driving certain ones of driven rolls of the module-forming chamber, to stall. In addition, the lumps introduce many problematic issues with the plastic wrap, such as, making the plastic prone to being torn thereby permitting entry of contaminates, pulling the plastic away from the ends of the module thereby causing a reduction in, and/or the elimination of, coverage of the ends of the module, and leaving areas unsupported where there are voids in the cotton. Further, at the gin, machinery used to turn the cotton module when removing the plastic wrap does not operate as well with lumpy modules.

It is presently thought that the lumps are introduced at the module surface during the operation of placing a plastic wrapping on the module. Specifically, the circumference of the module-forming chamber is defined by a plurality of endless belts supported in side-by-side relationship across a plurality of fixed and movable rolls, with one of the fixed rolls being a lower front roll of a discharge gate forming a rear section of the module-forming chamber, with the lower front gate roll defining a rear boundary of an inlet located at the bottom of the module-forming chamber and with a front boundary of the inlet being defined by a starter roll. During formation of a cotton module in the module-forming chamber, cotton is fed into the inlet on a path which directs it against the front of the lower gate roll. As the forming module is rotated, cotton at the surface of the module expands in the inlet zone between the starter roll and the lower front gate roll. This expanded cotton, together with incoming cotton, is actively lifted onto the surface of the growing cotton module by the side edges of the belts which come into contact with the fluffy cotton. In one known machine, eleven module-forming belts are used, resulting in twenty two edges being available to aid in transporting the cotton. Upon a cotton module being completed within the module-forming chamber, the introduction of further cotton is interrupted and plastic wrapping material in introduced into the inlet at the bottom of the module-forming chamber from a source roll carried at the rear of the discharge gate. The completed cotton module continues to rotate and the introduced plastic is caught between the belts and the rotating module and is carried around by the module. During the first revolution of the module, the cotton at the surface of the unwrapped portion of the module still expands at the chamber inlet in the zone between the starter roll and the lower front gate roll. However, since the module-forming belts at their region of engagement with the lower front gate roll are now covered with plastic, the edges are no longer available for actively lifting the expanded cotton, and this cotton momentarily hesitates, thus becoming bunched at various locations along the front of the lower front gate roll, with these bunches eventually entering the pinch point between the roll-supported wrapping material and the surface of the formed module so as to form lumps beneath the wrapping material. The formation of bunches of cotton which are subsequently fed onto the module surface is an irregular happenstance, thus resulting in a wrapped module having a lumpy exterior.

The problem to be solved then is to provide a module-forming chamber arrangement constructed so as to eliminate or reduce the formation of lumps on the surface of a wrapped cotton module.

SUMMARY OF THE INVENTION

According to the present invention, there is provided a module-forming arrangement for forming cylindrical cotton modules which is constructed so as to form wrapped cotton modules having a smooth exterior.

An object of the invention is to provide a module-forming arrangement including a structure within the module-forming chamber which inhibits the formation of cotton bunches forwardly of the lower gate roll during the operation of wrapping a formed cylindrical cotton module with a plastic wrapping and in this way eliminates the formation of lumps on the circumference of the wrapped cotton module.

The foregoing object is achieved by placing a rake-like bunching eliminator at a location within the module-forming inlet which is between the starter roll and the lower front module-forming belt support roll carried by the module discharge gate. The bunching eliminator comprises a cross member in the form of a tubular rod having opposite ends mounted for rotation in opposite side walls of the module-forming chamber for movement, against a biasing spring, between an up-stop, wherein a plurality of transversely spaced tines carried by, and projecting to the rear from, the cross member lie in an upwardly inclined plane which makes an angle of approximately 15° with a horizontal plane that is approximately tangent to a top surface of the lower front gate roll, and a down-stop, wherein the tines lie in a downwardly inclined plane which makes an angle of approximately 45° with the horizontal plane. The location of the down-stop is chosen for preventing interference between the tines and the belt of a conveyor used for transporting the cotton from an accumulator zone into the inlet of the module-forming chamber.

DESCRIPTION OF THE PREFERRED EMBODIMENT

Figure 1:
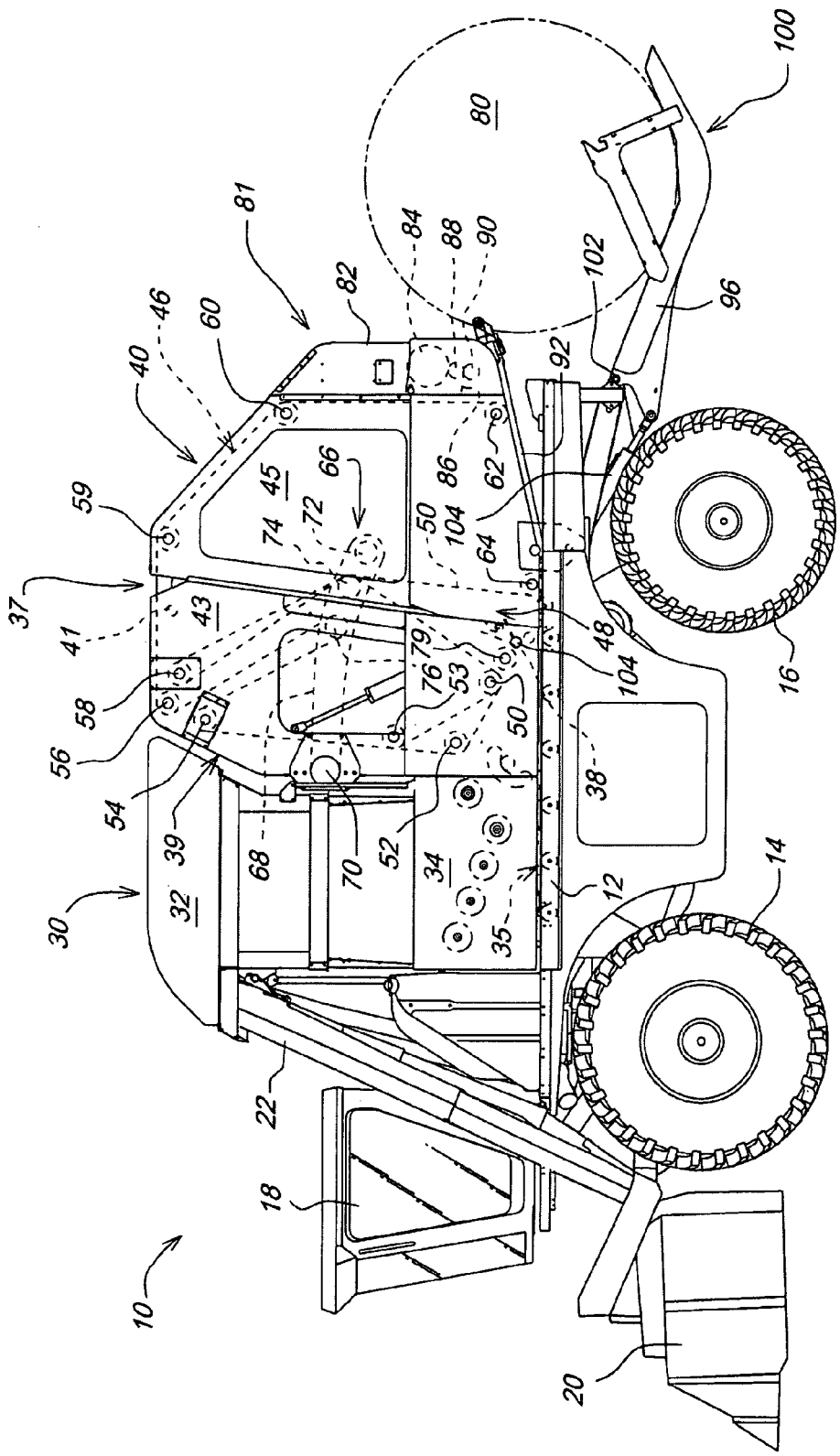
FIG. 1 is a left side elevational view of a cotton harvesting machine equipped with a cylindrical module-forming baler embodying the cotton bunching eliminator of the present invention.

Referring now to FIG. 1, there is shown a self-propelled cotton harvester 10 including a main frame 12 supported for movement by forward drive wheels 14 and rear steerable wheels 16. An operator's station or cab 18 is supported at a forward location on an elevated region of the frame so as to provide an operator a clear view of a cotton harvesting head 20 mounted to a forward end of the frame 12, the harvesting head 20 operating to remove cotton from plants and direct the removed cotton into an air conveying system including an air duct arrangement 22.

An upright cotton accumulator arrangement 30 with an upper inlet structure 32 and a metering floor 34 is supported on the frame 12 behind the cab 18 for receiving the cotton from the air duct arrangement 22. Beneath the metering floor 34 is a substantially horizontal belt conveyor arrangement 35 including an endless feed belt arrangement 36 (see FIG. 2) that conveys the cotton to an onboard baler arrangement 37, which is supported on the frame 12 at a location rearward of the accumulator arrangement 30 and is operable for forming large cylindrical cotton modules.

The baler arrangement 37 includes a module-forming chamber 38 broadly similar to the bale-forming arrangement of the large round baler disclosed in U.S. Pat. No. 5,979,141, granted 9 Nov. 1999. Specifically, the module-forming chamber 38 includes a fixed front section 39 mounted to the main frame 12, and a rear section in the form of a discharge gate 40 having an upper front location mounted to an upper rear location of the forward section so as to establish a pivot assembly 41 defining a horizontal transverse pivot axis about which the discharge gate 40 may be selectively moved, by action of a conventional, extensible and retractable hydraulic cylinder assembly (not shown), between a lowered baling position, as shown in FIG. 1, and a raised discharge position, not shown, for permitting a completed and wrapped cotton module to be discharged beneath it.

Figure 2:
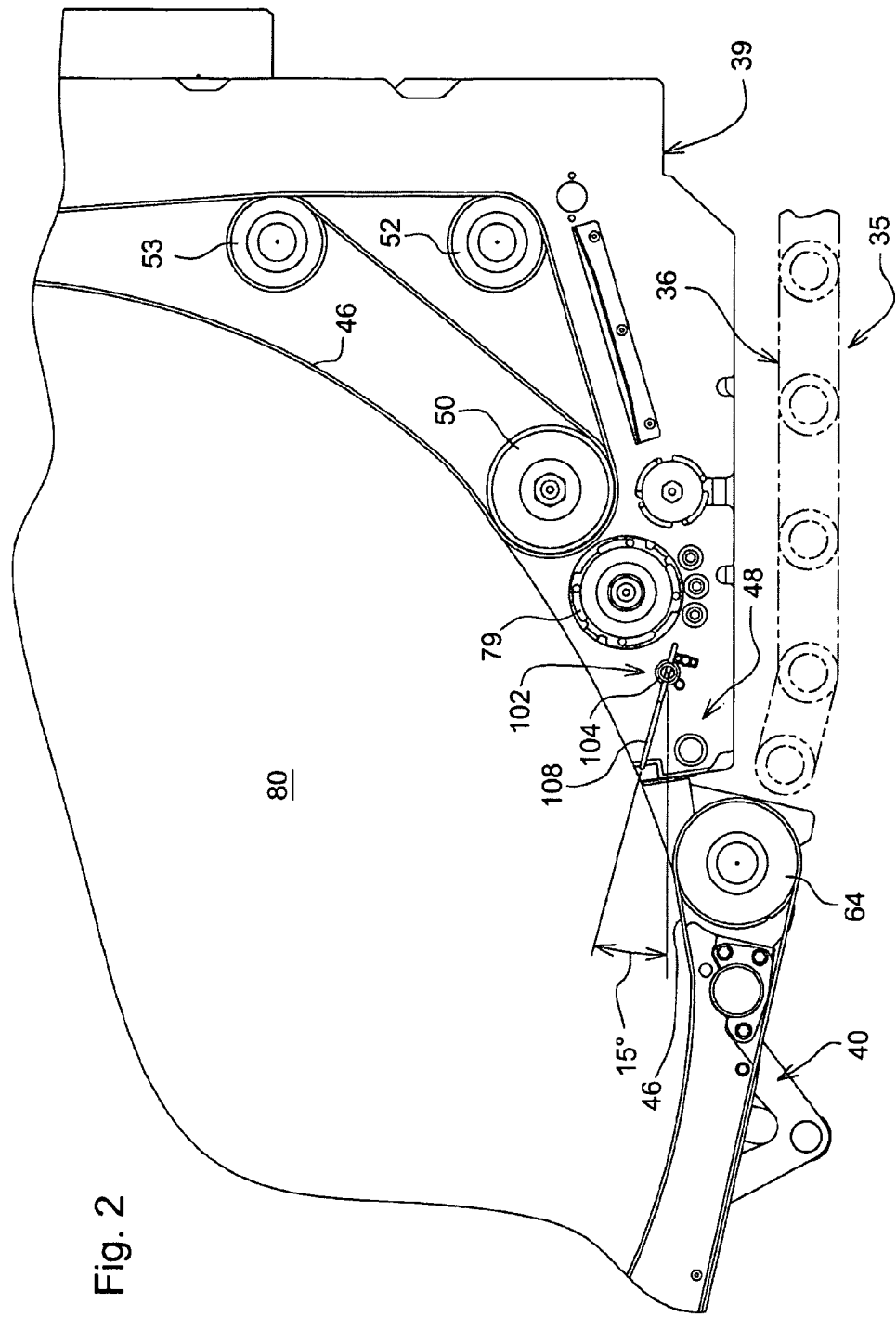
FIG. 2 is a right side view of the inlet region of the module-forming chamber of the baler shown in FIG. 1, but with the wrapping material guide structure removed and with the right side of the chamber removed to expose the rear region of the feed conveyor arrangement, shown in phantom, and the cotton bunching eliminator.
Figure 3:
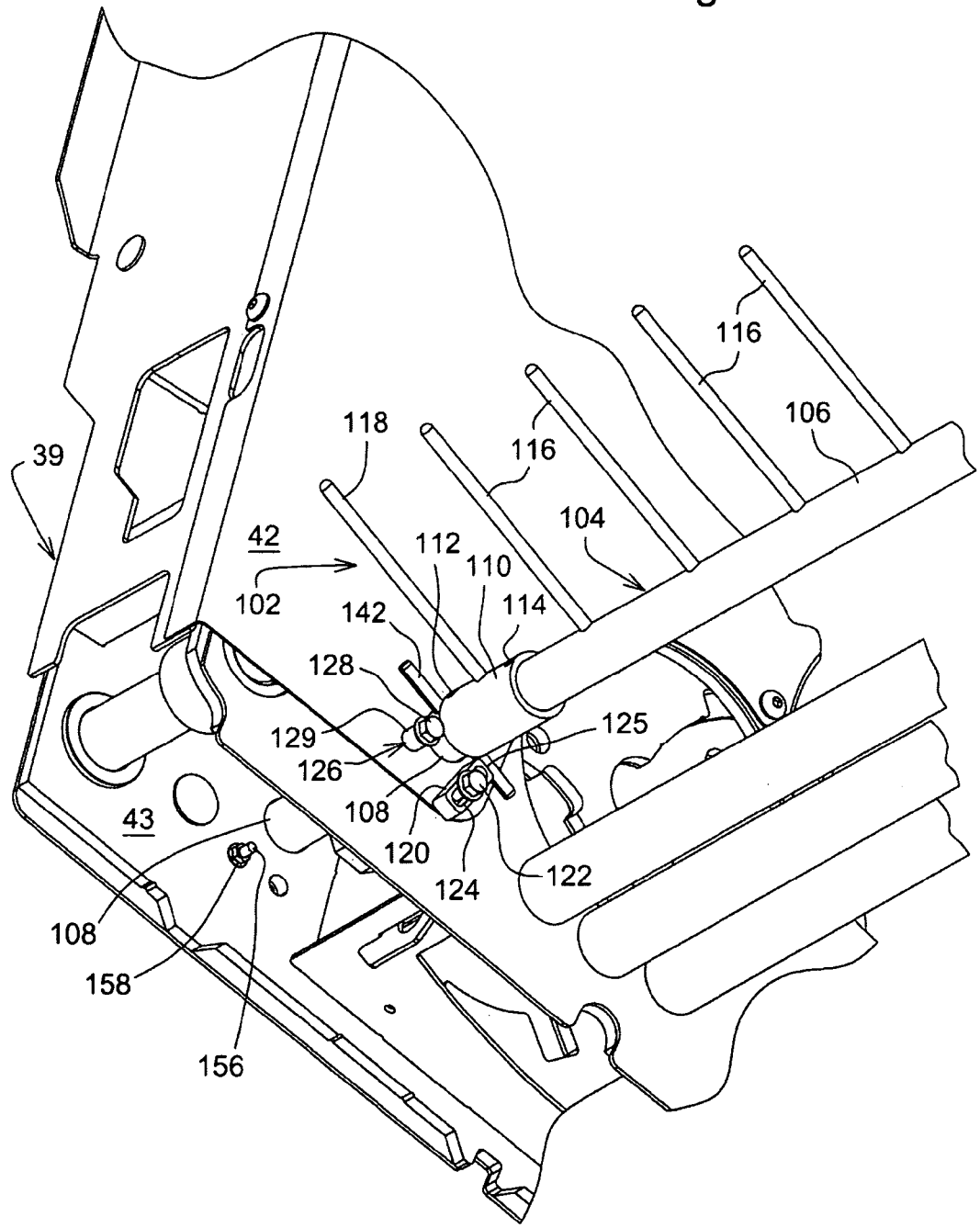
FIG. 3 is a bottom perspective view looking forwardly at a lower left region of the front section of the module-forming chamber showing the left end section of the cotton bunching eliminator including the up- and down-stop assemblies at the left inner side wall of the left chamber side wall assembly.
Figure 4:
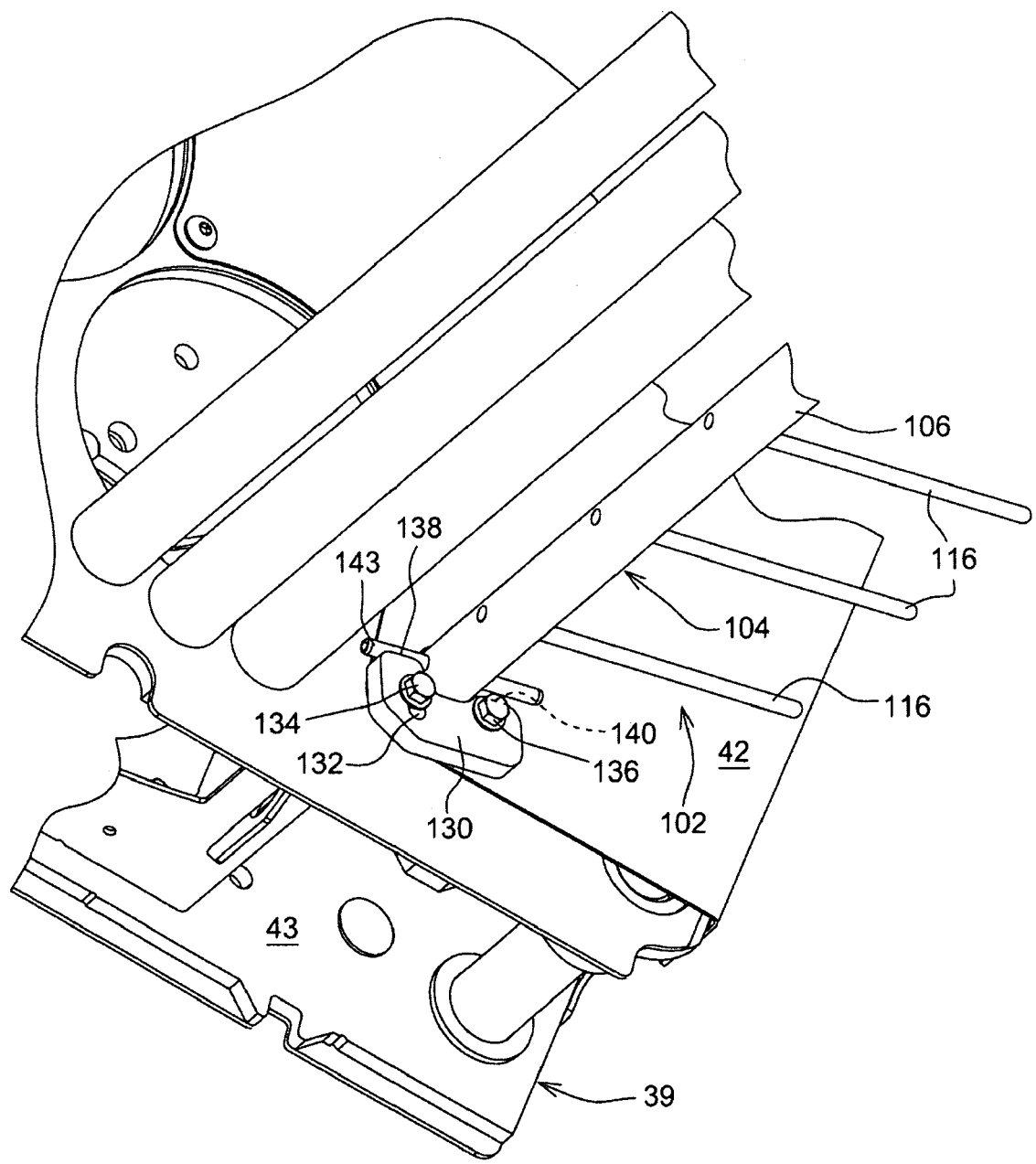
FIG. 4 is a bottom perspective view looking rearwardly at a lower right region of the front section of the module-forming chamber showing the right end section of the cotton bunching eliminator including the up-and-down-stop assembly at the right inner side wall of the right chamber side wall assembly.

Referring now also to FIGS. 2-4, it can be seen that the front section 39 and the discharge gate 40 each include opposite, double, side wall assemblies, with the wall assembly of the front section including a pair of transversely spaced inner side walls 42 that are respectively joined to a pair of transversely spaced outer side walls 43. Similarly, the discharge gate 40 includes a pair of transversely spaced inner side walls 44 that are respectively joined to a pair of outer side walls 45.

The circumference of the module-forming chamber 38 is defined by a module-forming arrangement including a plurality of endless belts 46 supported in side-by-side relationship across a support roll arrangement comprising a plurality of fixed belt-support rolls and a plurality of movable belt-support rolls. Specifically, proceeding clockwise from an upper boundary of an inlet 48 to the chamber 38 located at the bottom of the chamber, the fixed rolls include a lower rear roll 50, a lower front roll 52 a lower intermediate front roll 53, an upper intermediate front roll 54, a top front roll 56 and an upper rear roll 58, all extending between, and having opposite ends rotatably mounted to, the fixed inner side walls 42 of the fixed chamber front section 39. Continuing on, the fixed rolls further include a top front gate roll 59, an upper rear gate roll 60, a bottom rear gate roll 62 and a bottom front gate roll 64 all extending between and having opposite ends rotatably mounted to the gate inner side walls 44.

A belt tensioning arm arrangement 66 comprises a pair of transversely spaced arms 68 having forward ends joined to a transverse tube that extends between, and is pivotally mounted, as at a pivot arrangement 70, to a middle front region of the fixed inner side walls 42. The plurality of movable rolls comprise three rolls 72, 74 and 76, which extend between and have opposite ends respectively rotatably mounted to the arms 68 of the tensioning arm arrangement 66. The roll 72 is located at a rear end of the arms 68, the roll 74 is positioned in adjacent spaced relationship to the roll 72, and the roll 76 is spaced toward the pivot arrangement 70 from the roll 74.

Beginning at the lower rear roll 50, the endless, module-forming belts 46 are looped under the roll 50 and include outer runs, with alternate ones of the outer runs being engaged first with the lower front roll 52 and then with the lower intermediate front roll 53 while the remaining ones of the outer runs bypass the lower front roll 52 and go directly to the lower intermediate front roll 53. From there, the outer runs of the belts 46 are serially engaged with the upper intermediate roll 54, the movable roll 76, the top front roll 56, the top front gate roll 59, the upper rear gate roll 60, the lower rear gate roll 62, and the lower front gate roll 64. An inner run of the belts 46 includes a loop engaged over the top rear fixed roll 58, which extends between an upper central region of the fixed side walls 42, with the loop being positioned between the movable rolls 72 and 74. As shown, the tensioning arm arrangement 66 is in an initial, lowered position corresponding to when the module-forming chamber 38 is in an empty condition, with the module-forming belts 46 defining the perimeter of the chamber 38, which is initially a generally triangular shape, as viewed from the side. The tensioning arm arrangement 66 normally includes tensioning elements such hydraulic cylinders and/or springs (not shown, but well known) which are mounted between the fixed walls 42 and the arms 68 so as to yieldably resist their upward movement as the module-forming chamber 38 becomes filled with cotton. One or more of the fixed rolls are driven so as to cause the belts 46 to be driven, with the drive direction being such as to cause the incoming cotton to travel counterclockwise as it is added as a spiral layer to the growing cotton module. To aid in this counterclockwise movement of the cotton during initial formation of the module, a driven starter roll 79 extends between and has opposite ends mounted for rotation in the inner and outer side walls 42 and 43 of the front module-forming chamber section at a location down, and to the rear, from the bottom front roll 50, with the periphery of the starter roll 79 being close to the periphery of the roll 50. As viewed in FIG. 1, the starter roll 79 is driven clockwise so as to strip the cotton conveyed by the downwardly traveling run of the module-forming belts 46 forming the front of the triangular shaped space, with the result that the cotton is rolled into a cylinder, which grows and expands against the tensioned belts until a module of a desired diameter is formed.

As can best be seen in FIG. 2, the feed conveyor arrangement 35, shown in phantom lines, has a rear terminal end located adjacent a front periphery of the lower front gate roll 64 so that cotton is conveyed directly against the module-forming belts 46 engaged with the roll 64. When the discharge gate 40 is in its lowered, baling position, as shown, the rear roll 50 and the starter roll 79 of the fixed front chamber section 39 are each located at a height above the height of the lower front gate roll 64, with the rolls 50, 79 and 64 being located so that their peripheries are located to engage the circumference of a completed cotton module 80 located in the module-forming chamber 38.

Referring back to FIG. 1, a module or bale wrapping arrangement 81 is shown mounted at the rear of the discharge gate 40 for the purpose of wrapping the completed module of cotton 80 so as to hold it together and protect it from the elements once it is discharged from the module-forming chamber 38. The wrapping system 81 includes a cover 82 hinged at its top and covering an active wrapping material supply roll 84 consisting of wrapping material 86. The wrapping material 86 used here is preferably, but not necessarily, formed from semi-permeable plastic sheet. An end section of wrapping material 86 extends downwardly from a forward side of the supply roll 84 and is fed between upper and lower wrap material feed rolls 88 and 90, respectively, with the upper roll 88 being engaged with, and located slightly behind, the lower roll 90 so that a common tangent to the rolls, at their line of contact, extends upwardly and forwardly toward a vertically disposed segment of the outer run of the module-forming belts 46. At the beginning of a wrapping cycle, a belt drive (not shown) including belt pulleys coupled to respective ends of the lower rear gate roll 62 and the upper feed roll 88 is established and the length of wrapping material is delivered against the vertical segment of the outer run of the belts 46 and carried to a wrapping material guide structure 92 which extends beneath a lower segment of the outer run of the belts 46, this lower segment of the belts 46 acting to carry the wrapping material along the guide structure 92, and then around the lower front gate roll 64 and into the module-forming chamber 38, by way of the chamber inlet 40, the length of wrapping material 86 then being trapped between the module-forming belts 46 and the completed cotton module 80. The speed at which the wrapping material 86 is moved by the belts 46 and rotating module 80 is greater than the speed at which it is delivered by the feed rolls 88 and 90, causing the wrapping material 86 to be tensioned and stretched as it is wrapped about the module 80. Once a desired length of the wrapping material (1.5 to 2 wraps, for example) is wrapped about the cotton module 80, the drive to the feed roll 88 is discontinued and a cutting mechanism, which may be in the form of a knife and anvil arrangement, for example, (not shown) located just downstream of the feed rolls 88 and 90 is actuated so as to sever the wrapped material 86 from the unwrapped material remaining on the supply roll 84. A knife-operation sensor (not shown) is used for providing a signal to a computer (not shown) located in the cab of the harvester 10 for initiating operation of a pair of hydraulic gate cylinders (not shown), which are coupled between the fixed side walls 42 and the gate side walls 44, as is well known, for causing the discharge gate 46 to be pivoted to its raised discharge position for permitting a wrapped module 80 to roll onto a cradle-shaped framework 96 of a module discharge arrangement 100.

Up to this point, the structure described is conventional.

Figure 5:
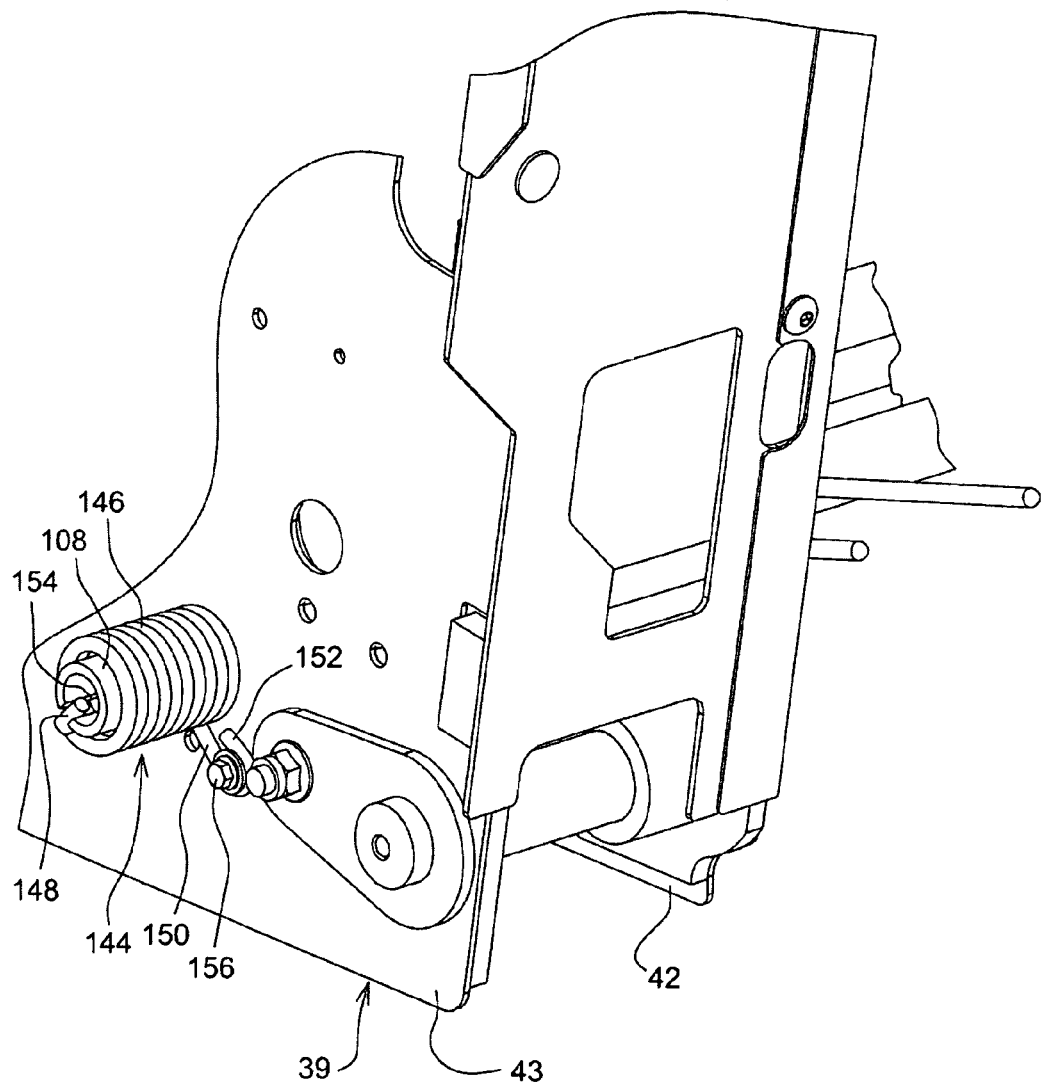
FIG. 5 is a left rear perspective view of the lower left region Of the front section of the module-forming chamber, with parts removed showing the mounting of the torsion coil spring between the left end of the bunching eliminator cross member and the left side wall arrangement.

The present invention resides in a cotton bunching eliminator 102, which as clearly shown in FIG. 2, is mounted within the inlet 48 to the module-forming chamber 38 at a location just behind the starter roll 79 for the purpose of preventing cotton from bunching ahead of the lower front gate roll 64 during the operation of wrapping a formed cotton module with plastic wrapping. Referring also to FIGS. 3-5, it can be seen that the bunching eliminator 102 is in the form of a rake comprising an elongate cross member defined by a cylindrical tube 104 comprising a major tube portion 106 extending across substantially the entire width of the module-forming chamber 38 and having a short right end region rotatably mounted within the right inner side wall 42. The cylindrical tube 104 further includes a relatively long left end region defined by a tube extension 108 mounted for rotation in the left inner and outer side walls 42 and 43, respectively, and coupled to the major tube portion 106 by a cylindrical coupler 110 received on a short right end region of the tube extension 108 and on a short left end region of the major tube portion 106. A first cylindrical spring pin 112 is received in a first set of diametrically oriented holes provided in the extension 108 and the coupler 110, and a second cylindrical spring pin 114 is received in a second set of diametrically oriented holes provided in the major tube portion 106 and the coupler 110. A plurality of tines 116 project diametrically through, and are fixed at, equally spaced locations across the length of the major tube portion 106. A similar tine 118 projects diametrically through, and is fixed to, the coupler 110 at a location midway between opposite ends of the coupler, the tine 118 being located between adjacent ends of the tube extension 108 and the main tube portion 106. Thus, it will be appreciated that the tube 104 may be assembled to the front section 39 of the module-forming chamber 38 prior to having the tube extension 108 coupled to the coupler 110. In this condition, the right end section of the main tube portion 106 is inserted into the hole provided in the right inner side wall 42, with the tube extension 108 then being inserted, from the outside, through the aligned circular openings respectively provided in the left outer side wall 43 and the left inner side wall 44. The right end of the tube extension 108 is inserted into the coupling 110 and secured there by the insertion of the spring pin 112.

As can best be seen in FIG. 3, an up-stop member 120 is fixed to the left inner side wall 42 at a location below and slightly forward of the tube extension 108 by a clamping bolt 122 extending through a hole provided in the left inner side wall 42 and having a threaded outer end on which is received a nut (not shown). The up-stop member 120 is in the form of a bar provided with an adjustment opening 124, which is elongated in an upward direction and receives the bolt 122. A top of the member 120 is defined by an up-stop surface 125. Spaced rearward from the up-stop member 120 is a down-stop member 126 in the form of a bushing fixed against the inner side wall 42 by a bolt 128 which projects outwardly through the bushing and a hole in the left inner side wall 42 and which has an outer threaded end (not shown) on which a nut is received and tightened. An upper portion of the member 126 defines a down-stop surface 129.

As can best be seen in FIG. 4, a combined up-stop and down-stop plate member 130 is fixed to the right inner side wall 42 at a location beneath the major tube portion 106. The member 130 contains a vertically elongated adjustment opening 132 located forwardly of the tube portion 106, with a clamping bolt 134 projecting outwardly through the opening 132 and a hole provided in the right inner side wall 42, the bolt having a threaded outward end (not shown) on which is received a nut. Provided in the member 130 at a location to the rear of the tube portion 106 is a hole, with a clamping bolt 136 projecting outwardly through the hole and an aligned hole in the right inner side wall 42, the bolt having a threaded outward end (not shown) on which is received a nut. The plate member 130 has an upper edge including an elevated forward end section defining an up-stop surface 138, while a rear section of the upper edge is stepped down from the up-stop surface 140 and defines a down-stop surface 140.

As can be seen in FIG. 3, a left elongate stop pin 142, in the form of a spring pin, is inserted through a diametrically disposed hole provided in the tube extension 108 at a location adjacent the left inner side wall 42 and is disposed for alternately contacting the up- and down-stop surfaces 125 and 129 Similarly, as shown in FIG. 4, a right elongate stop pin 143, in the form of a spring pin, is inserted through a diametrically disposed hole provided in the main tube portion 106 at a location adjacent the right inner side wall 42 and is disposed for alternately contacting the up- and down-stop surfaces 138 and 140. The stop pins 142 and 143 are oriented similarly with respect to the cross tube 104. The up-stop surfaces 125 and 138 are adjusted to be similarly disposed relative to the pins 142 and 143, with the down-stop surfaces 129 and 140 being disposed similarly relative to each other so that contact between the stop pins and the up- and down-stop surfaces controls the range of angular motion through which the cross tube 104 may rotate.

Figure 6:
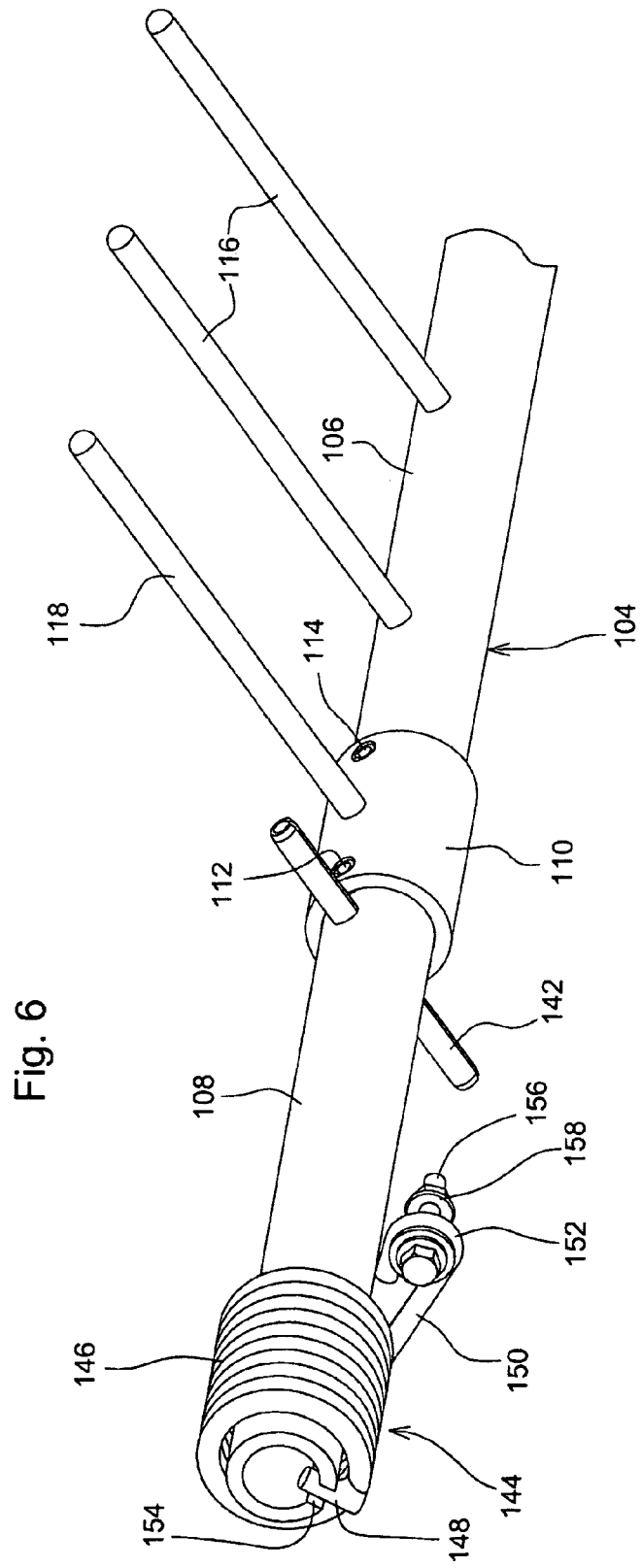
FIG. 6 is a left rear perspective view of a left end region of the cotton bunching eliminator showing the connection between the main section of the cross member and a left end extension and showing the coil torsion spring carried by the extension.

Referring now to FIGS. 5 and 6, there is shown a coil torsion spring 144 received over an exposed end of the tube extension 108 which projects outwardly from the left outer side wall 43. The torsion spring 144 includes a central coiled section 146 joined to a radially inwardly projecting outer end section 148 and a rearwardly projecting inner end section 150, the latter having a back-turned terminus forming an eye 152. The outer end section 148 is received in a slot 154 provided in the outer end of the tube extension 108 so as to retain the outer end of the spring 144 relative to the tube extension 108. A clamping bolt 156 projects inwardly through the eye 152 of the inner end section 150 of the spring 144 and through a hole in the left outer side wall 43, with the bolt 156 having a threaded inner end receiving a nut 158 (see FIG. 3). The spring 144 is a relatively "soft" spring and is slightly tensioned so that the tube 104, as viewed from its left end, is biased counter clockwise, with the stop pins 142 and 143, respectively, being biased into engagement with the up-stop surfaces 125 and 138. With this engagement of the stop pins 142 and 143 with the up-stop surfaces 125 and 138, the tines 116 and 118 are inclined upwardly to the rear at an angle of approximately 15° to the horizontal, as shown in FIG. 2, with it being noted that the axis of rotation of the tube 104 is located approximately at a radius passing through the axes of rotation of the starter roll 79 and the lower front gate roll 64 and that, when the tines 116, 118 are horizontal they lie in a plane that is approximately tangential to the top of the lower front gate roll 64. Downward movement of the tines 116 and 118 is limited to approximately 45° below horizontal, this limitation ensuring that the tines do not come into contact with, and damage, the cotton feed belt arrangement 36 of the conveyor arrangement 35.

In operation, assuming that a completed cotton module 80 has been formed in the module-forming chamber 38, the feeding of harvested cotton to the chamber inlet 48 by the feed conveyor arrangement 35 will be terminated, while the module 80 continues to be rotated clockwise, as viewed in FIG. 2. A drive to the wrapping material feed rolls 88 and 90 is engaged so that a length of plastic wrapping material 86 is fed against the upright run of the module-forming belts 46 at the rear of the discharge gate 40, this run of belts traveling downwardly so as to carry the wrapping material 86 to the material guide 92 extending forwardly beneath the discharge gate 40. The belts 46 pass around the lower rear gate roll 62 and carry the wrapping material forwardly along the material guide 92 to the module-forming chamber inlet 48. There the wrapping material 86 is carried upwardly around the lower front gate roll 64 and covers the belts 46 at that location, while at the same time being engaged by the periphery of the rotating module 80. The tendency for the cotton at the surface of the module 80 to expand into the inlet 48 in the space ahead of the lower front gate roll 64 is reduced or eliminated by the tines 118, 119 carried by the spring-loaded tube 104 of the bunching eliminator 102, with the tines ensuring that the surface cotton of the rotating module is effectively delivered to the pinch point of the module 80 and the lower front gate roll 64 so that the surface cotton does not hesitate, and result in cotton being bunched ahead of the gate roll 64, and thereby eliminates lumps being formed on the surface of the module 80 beneath the wrapping material 86.

Because the tines 118, 119 are inclined towards the rear, and the coil torsion spring 144 is a relatively "soft" spring, any contact of the tines with the rotating module 80 will cause the tines to deflect downwardly, and, when a first layer of the plastic material 86 finally encompasses the module 80, no damage will result to the material 86 because of contact with the tines. Downward deflection or movement of the tines 118, 119 is limited by the stop pins 142 and 143, respectively, coming into contact with the down-stop surfaces 129 and 140. The positions of the down-stop surfaces 129 and 140 are selected so as to prevent the tines 118, 119 from coming into contact with, and possibly causing damage to, the feed belt arrangement 36 of the feed conveyor arrangement 35.

Having described the preferred embodiment, it will become apparent that various modifications can be made without departing from the scope of the invention as defined in the accompanying claims.

The invention claimed is:

1. In an expansible module-forming chamber for forming large cylindrical modules of cotton, with the chamber including opposite side wall arrangements, a plurality of fixed belt-support rolls extending between, and having opposite ends respectively mounted for rotation in, said side wall arrangements, a belt tension arm arrangement including at least a pair of parallel arms located adjacent said opposite side wall arrangements and being mounted to said side wall arrangement for pivoting vertically during formation of a module within said chamber, a plurality of movable belt-support rolls extending between and having opposite ends mounted for rotation in said pair of arms, a circumference of said chamber being defined by a plurality of endless, flexible belts mounted in side-by-side relationship to each other across said plurality of fixed and movable rolls, said chamber including a fixed front section and a movable rear section defining a discharge gate mounted to an upper rear location of said front section for swinging vertically between a lowered baling position and a raised discharge position, an inlet being defined in a bottom of said chamber and bounded at a rear side by a lower front gate roll of said fixed rolls, when said discharge gate is in its baling position, and a module wrapping arrangement being mounted on said discharge gate and including feed elements for selectively feeding a length of plastic wrapping material into said inlet for being carried about a cotton module formed in said chamber, the improvement comprising: said baling chamber further including a cotton bunching eliminator including an elongate cross-member located in said inlet in front of, and extending parallel to said lower front gate roll, the elongate member extending between, and being mounted to said opposite side wall arrangements forming part of said fixed front section of said chamber; and a plurality of bunching-preventing elements being joined to, and projecting to the rear from, said elongate member.

2. The expansible module-forming chamber, as defined in claim 1, wherein said cross-member of said cotton bunching eliminator is a tube and said bunching preventing elements are tines mounted to, and projecting rearwardly from, said tube.

3. The expansible module-forming chamber, as defined in claim 1 wherein said cross-member of said cotton bunching eliminator is mounted for pivoting about a horizontal axis extending parallel to said lower front gate roll; a spring arrangement being mounted between at least one of said opposite side wall arrangements and said cross-member and exerting a biasing force on said elongate member so as to resiliently resist downward movement of said bunching-preventing elements.

4. The expansible module-forming chamber, as defined in claim 3, wherein said cross-member is a cylindrical tube, and said spring arrangement including a coil torsion spring received on one end of said cylindrical tube, with one end of said spring being coupled to said tube and with another end of said spring being coupled to an adjacent side wall assembly.

5. The expansible module-forming chamber, as defined in claim 4, wherein said cross-member includes an end section which is separate from a remaining portion of said cross member and projects through said adjacent side wall assembly; a cylindrical coupler joining an inner end of said end section to said remaining portion of said cross-member; and said coil torsion spring being received on an outer end of said end section of said cross-member.

6. The expansible module-forming chamber, as defined in claim 3, and further including a stop arrangement mounted to the elongate member and said opposite side wall arrangements for restricting pivotal movement of said elongate member within a pre-selected range of movement.

7. The expansible module-forming chamber, as defined in claim 1, wherein said plurality of fixed rolls includes a bottom belt-support roll located in said front section of said module-forming chamber, with said bottom belt-support roll being located at a level above said lower front gate roll; said module-forming chamber further including a starter roll having a circumference disposed adjacent said bottom roll of said front section and approximately on a line of centers extending between said bottom roll and lower front roll; said cross-member being disposed along an axis located approximately on said line of centers at a height approximately equal to a top of said lower front gate roll; and said bunching eliminator elements being located in a plane inclined upwardly from a horizontal plane which is approximately tangent to said lower front gate roll.

8. The expansible module-forming chamber, as defined in claim 7, wherein said plane inclined upwardly makes an angle of approximately 15° with said horizontal plane.

9. The expansible module-forming chamber, as defined in claim 7, wherein said cross-member is mounted for pivoting about said axis; an up-stop arrangement including at least one stop member carried by said cross-member at a location adjacent one of said opposite side wall arrangements; and an up-stop member mounted to said one of said opposite side wall arrangements and having an up-stop surface located for being engaged by said stop member when said tines are located in said plane inclined upwardly; and a biasing arrangement being coupled between said cross-member and said one of said side wall arrangements and resisting movement of said stop member away from said up-stop surface.

10. The expansible module-forming chamber, as defined in claim 9, wherein said up-stop arrangement includes a second stop member carried by said cross-member at a location adjacent a second of said opposite side wall arrangements and a second up-stop member being mounted to said second of said opposite side wall arrangements and having a second up-stop surface located for engagement by said second stop member.

11. In a module-forming chamber for forming cylindrical modules of cotton, the chamber having sides delimited by opposite side wall arrangements and a circumference delimited by a plurality of endless belts supported in side-by-side relationship across a plurality of fixed belt-support rolls extending between and having opposite ends rotatably mounted in said opposite side wall arrangements, with opposite ends of said plurality of endless belts being looped about adjacent first and second ones of said plurality of fixed belt-support rolls, and with said first and second ones of said plurality of fixed belt-support rolls being spaced from each other so as to define a chamber inlet; a module wrapping arrangement being mounted on an exterior of said module-forming chamber in a location for selectively supplying a plastic wrapping to an interior of said chamber, by way of said inlet at a pinch-point between said first of said plurality of fixed rolls and a formed module located within said chamber, the improvement comprising: a lump eliminator located within said inlet and including an elongate cross member extending parallel to said first of said plurality of fixed rolls and having opposite ends mounted to said opposite side wall assemblies; a plurality of transversely spaced tines being fixed to said cross member and having free ends located approximately on a transverse line located so as to be at the circumference of a completed cotton module located in the module-forming chamber and engaged with said first and second ones of said plurality of fixed rolls, whereby said lump eliminator acts, during an operation of wrapping the module with a plastic wrapping, to prevent cotton at a surface of the module from expanding into the inlet as the module goes through one revolution after wrapping material is introduced into said inlet.

* * * * *